United States Patent [19]

Yamaguchi

[11] Patent Number: 5,046,859

[45] Date of Patent: Sep. 10, 1991

[54] TEMPERATURE MEASURING DEVICE AND THERMAL HEAD DEVICE HAVING THE SAME

[75] Inventor: Shingo Yamaguchi, Atsugi, Japan

[73] Assignee: Ricoh Company, Ltd., Tokyo, Japan

[21] Appl. No.: 363,499

[22] Filed: Jun. 8, 1989

[30] Foreign Application Priority Data

| | | | |
|---|---|---|---|
| Jun. 17, 1988 | [JP] | Japan | 63-148192 |
| Jul. 29, 1988 | [JP] | Japan | 63-188299 |
| Jan. 6, 1989 | [JP] | Japan | 64-411 |

[51] Int. Cl.[5] ...................... G01D 15/10; G01D 23/20

[52] U.S. Cl. .................................... 374/185; 219/216; 307/310; 346/76 PH

[58] Field of Search ............... 374/183, 170, 171, 185, 374/170; 377/25; 307/234, 310; 364/557; 328/3, 11; 219/216; 346/76 PH

[56] References Cited

U.S. PATENT DOCUMENTS

| | | | |
|---|---|---|---|
| 2,984,789 | 5/1961 | O'Brien | 307/234 X |
| 3,600,688 | 8/1971 | Booth | 307/234 |
| 3,609,563 | 9/1971 | Zinn | 307/234 |
| 3,713,033 | 1/1973 | Frerking | 328/3 |
| 3,725,789 | 4/1973 | Mager | 328/3 |
| 3,778,794 | 12/1973 | Szabo et al. | 307/234 X |
| 4,009,443 | 2/1977 | Coulter et al. | 307/234 |
| 4,092,863 | 6/1978 | Turner | 374/170 X |
| 4,113,391 | 9/1978 | Minowa | 346/76 PH X |
| 4,132,116 | 1/1979 | Zeeb | 374/171 X |
| 4,150,573 | 4/1979 | Iinuma et al. | 374/185 |
| 4,237,420 | 12/1980 | Ebihara et al. | 307/310 X |
| 4,366,489 | 5/1982 | Yamaguchi . | |
| 4,602,871 | 7/1986 | Hanaoka | 377/25 X |

FOREIGN PATENT DOCUMENTS

| | | |
|---|---|---|
| 60-13569 | 1/1985 | Japan . |
| 61-29558 | 2/1986 | Japan . |
| 61-28516 | 6/1986 | Japan . |

OTHER PUBLICATIONS

IBM Technical Disclosure Bulletin, vol. 21, No. 7, 12/1978, "Signal Powered Data Collection System", pp. 2945–2946.

*Primary Examiner*—Daniel M. Yasich

*Attorney, Agent, or Firm*—Cooper & Dunham

[57] ABSTRACT

A temperature measuring device includes a temperature-sensitive element positioned in the vicinity of a member to measure temperature thereof. The temperature-sensitive element changes its resistance with temperature variation. A pulse generator generates a pulse of a pulse width depending on the resistance of the temperature-sensitive element. A pulse width measuring circuit measures the pulse width of the pulse derived from the pulse generator. The measured pulse width indicates the temperature of the member.

15 Claims, 8 Drawing Sheets

TEMPERATURE MEASURING DEVICE AND THERMAL HEAD DEVICE HAVING THE SAME

BACKGROUND OF THE INVENTION

The present invention generally relates to a temperature measuring device, and particularly to a temperature measuring device which employs a temperature-sensitive resistor such as a thermistor or a posistor. Further, the present invention relates to a thermal head device having such a temperature measuring device. The present invention is suitable for adjusting electrical energy supplied to thermal elements arranged in a thermal head on the basis of a temperature variation thereof in order to obtain uniform printing characteristics.

Currently, thermal printers are widely used. A thermal printer employs a thermal head, which includes a number of thermal elements. In order to obtain uniform printing characteristics, it is required to adjust the power supplied to thermal elements arranged in a thermal head, depending on a temperature variation thereof. For this requirement, conventionally, a thermistor is mounted on the thermal head. A thermistor changes its resistance in response to a variation in temperature. Power supplied to thermal elements is controlled by adjusting the pulse width of a pulse supplied thereto based on variations in temperature detected by the thermistor.

Japanese Patent Publication No. 61-28516 discloses a temperature measuring device using a thermistor. The disclosed device directly measures a resistance of the thermistor by a resistor and a comparator. The resistance value of the thermistor is converted into a voltage signal by the resistor. The comparator compares the voltage signal with a plurality of reference voltages. The comparison results indicate the resistance value of the thermistor. Alternatively, the resistance value of the thermistor may be obtained by extracting a voltage signal by using an analog-to-digital converter.

Japanese Laid-Open Patent Application No. 60-13569 discloses a temperature measuring device in which the resistance value of a thermistor is measured by converting the resistance into a frequency signal by a generator including a non-stable multivibrator. The pulse width to be supplied to thermal elements is adjusted according to the measured frequency.

As is well known, it is very difficult to manufacture thermal heads each having a plurality of thermal elements and each exhibiting almost the same value of composite resistance of the thermal elements. That is, the composite resistance value of thermal elements is different for different thermal heads. Therefore, the average composite resistance value of the thermal elements is measured for every thermal head during a manufacturing step.

Conventionally, dispersion of the resistance values of thermal elements is taken into account as follows. The average composite resistance value of the thermal elements is measured for every thermal head during a manufacturing step. The measured average resistance value obtained for each thermal head is written on a suitable portion thereof. Alternatively, the optimal pulse width for to the obtained resistance value is written. At the time of assembling a thermal printer, the optimal pulse width obtained for every thermal head is registered in a memory provided in a controller for controlling the thermal printer. In operation, when a variation in temperature of the thermal head is detected, and the optimal pulse width to be set at that time is determined from the stored pulse width and the measured temperature variation.

Japanese Laid-Open Patent Application No. 61-29558 proposes a temperature measuring device, which takes account of the dispersion of the resistance values of thermal elements. The proposed device has a head resistance identification code generator. A predetermined number of ranges of the average resistance values is provided so as to cover the possible average value of resistance of thermal elements. The generator is designed to output a identification code indicative of one of these ranges. Then, the generator is adjusted so as to output the identification code related to the average value of resistance over all thermal elements provided in the thermal head of concern. For this purpose, the generator includes switches or jumper wires each provided for the respective ranges. The switches or jumpers are connected to a resistor network provided outside the thermal head. The identification code is used for adjusting the pulse width applied to the thermal elements in addition to the detected temperature variation.

However, the temperature measuring device disclosed in Japanese Patent Publication No. 61-28516 has a disadvantage in that the device is complex. The device disclosed in Japanese Laid-Open Patent Application No. 60-13569 has a disadvantage in that the measurement of frequency change requires a large number of structural elements. Further, the aforementioned setting of the optimal pulse width is very troublesome because when a thermal head provided in a thermal printer is replaced with new one, it is required to rewrite the optimal pulse width stored in the memory. The Japanese Laid-Open Patent Publication No. 61-29558 presents the following disadvantages. That is, when the average value of resistance of the thermal elements is over a wide range, it is necessary to provide a number of switches or jumper wires. This makes the device complex. Additionally, since the device uses the switches or jumper wires, it is impossible to form the entire temperature measuring device on an integrated circuit chip.

SUMMARY OF THE INVENTION

It is therefore a general object of the present invention to provide a temperature measuring device in which the above-mentioned disadvantages are eliminated.

A more specific object of the present invention is to provide a temperature measuring device which is of a simple structure.

The above objects of the present invention can be achieved by a temperature measuring device including a temperature-sensitive element positioned in the vicinity of a member to measure temperature thereof, the temperature-sensitive element changing its resistance with temperature variation. A pulse generator, which is coupled to the temperature-sensitive element, generates a pulse of a pulse width depending on the resistance of the temperature-sensitive element. A pulse width measuring circuit, which is connected to the pulse generator, measures the pulse width of the pulse derived from the pulse generator. The measured pulse width indicates the temperature of the member.

The above-mentioned objects of the present invention can also be achieved by a temperature measuring device including a temperature-sensitive element positioned in the vicinity of a member to measure temperature thereof, the temperature-sensitive element changing its resistance with a temperature variation and a reference resistor having a reference resistance. A switch selects one of the temperature-sensitive element and the reference resistor. A pulse generator, which is coupled to the switch, generates a pulse of a pulse width depending on the resistance of the selectively connected temperature-sensitive element or reference resistor. A pulse width measuring circuit, which is connected to the pulse generator, measures the pulse width of the pulse derived from the pulse generator. The pulse width includes a first pulse width obtained when the switch selects the reference resistor, and a second pulse width obtained when the switch selects the temperature-sensitive element. A controller generates a temperature signal indicative of the temperature of the member from the first and second pulse widths supplied from the pulse width measuring circuit.

Another object of the present invention is to provide a thermal head device which employs the above-mentioned temperature measuring device.

The above object of the present invention can be achieved by a thermal head device comprising a thermal head including a plurality of thermal elements, a temperature-sensitive element positioned in the vicinity of the thermal head desired to measure temperature thereof, the temperature-sensitive element changing its resistance with a temperature variation, and a reference resistor having a reference resistance. A switch selects one of the temperature-sensitive element and the reference resistor. A pulse generator, which is coupled to the switch, generates a pulse of a pulse width depending on the resistance of the selectively connected temperature-sensitive element and reference resistor. A pulse width measuring circuit, which is connected to the pulse generator, measures the pulse width of the pulse derived from the pulse generator. The pulse width includes a first pulse width obtained when the switch selects the reference resistor, and a second pulse width obtained when the switch selects the temperature-sensitive element. A controller generates a temperature signal indicative of the temperature of the member from the first and second pulse widths supplied from the pulse width measuring circuit. A controller generates a driving signal to be supplied to the plurality of thermal elements from the temperature signal.

Other objects, features and advantages of the present invention will become apparent from the following detailed description when read in conjunction with the accompanying drawings.

DESCRIPTION OF THE PREFERRED EMBODIMENTS

Figure 1:
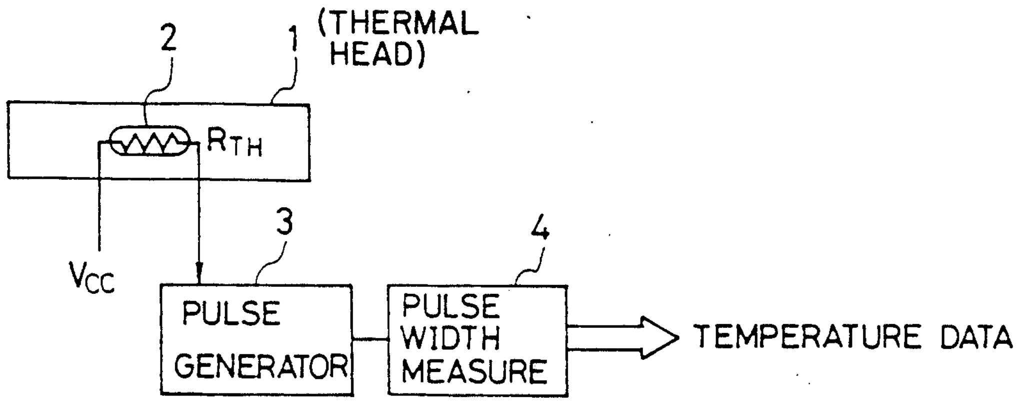
FIG.1 is a schematic block diagram of a first embodiment of the present invention.

FIG.1 schematically shows a temperature measuring device of a first preferred embodiment of the present invention. A thermal head 1 includes a plurality of thermal elements (thermal resistors). A temperature-sensitive element 2 is fastened to the thermal head 1. For example, the temperature-sensitive element 2 is formed by a thermistor. As is well known, a thermistor decreases its resistance with an increase of temperature. Alternatively, it is possible to use a posistor, which increases its resistance with an increase of temperature. The following description relates to the case where the temperature-sensitive element 2 is formed by a thermistor. A pulse generator 3 is at one end of the thermistor 2, the other end thereof is supplied with a power source voltage Vcc. The pulse generator 3 generates a pulse, the pulse width of which is changed by a variation in the resistance of the thermistor 2. A pulse width measuring circuit 4, which is connected to the pulse generator 3, measures the pulse width of the pulse derived from the pulse generator 3. Then the pulse width measuring circuit 4 outputs temperature data.

Figure 2:
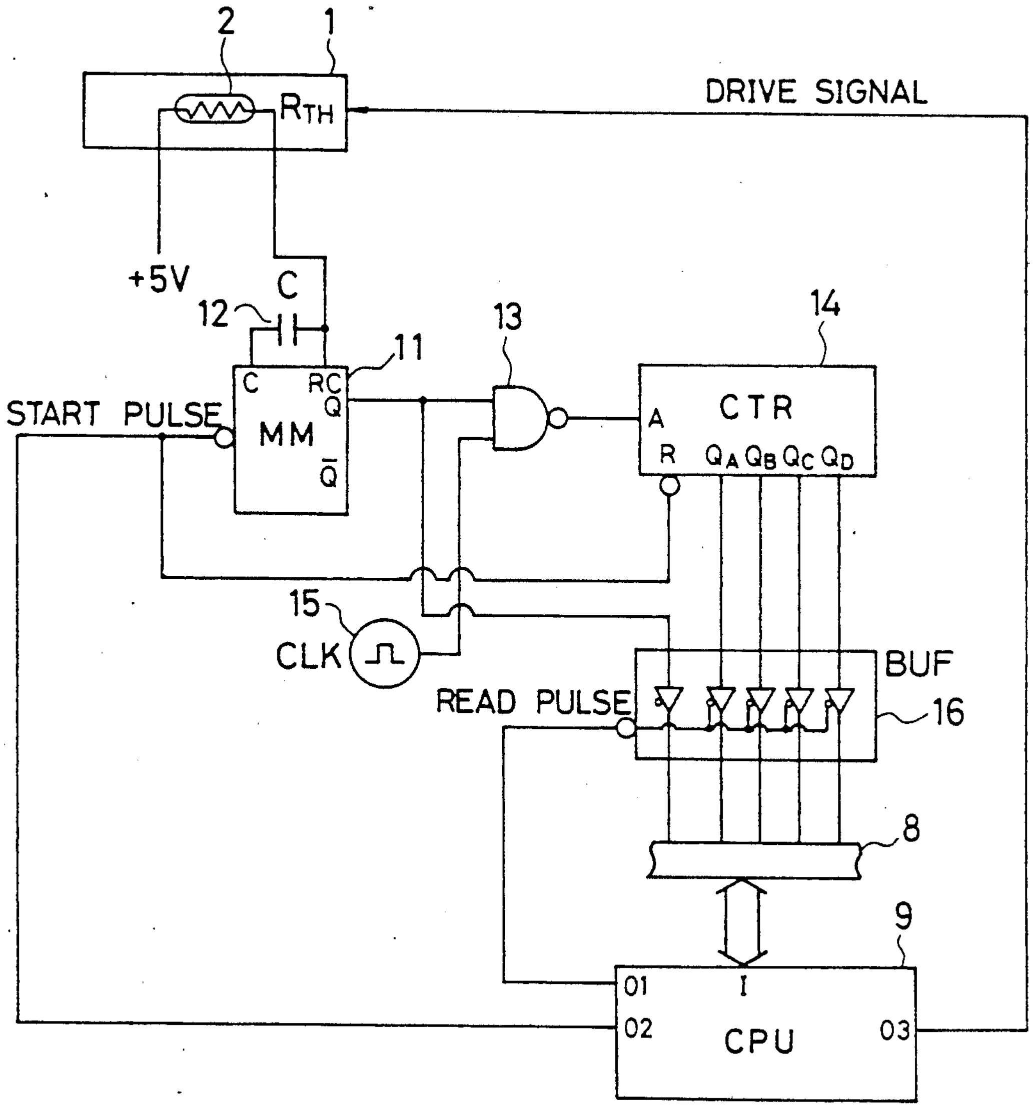
FIG.2 is a circuit diagram of the structure of FIG.1.

FIG.2 is a circuit diagram of the temperature measuring device shown in FIG.1. Referring to FIG.2, the pulse generator 3 (FIG.1) includes a monostable multivibrator 11. The monostable multivibrator 11 generates a pulse having a pulse width which is proportional to the product of a capacitance C of a capacitor 12 and a resistance $R_{TH}$ of the thermistor 2. One end of the capacitor 12 and thermistor 2 is connected to a resistor/capacitor terminal (RC) of the monostable multivibrator 11. The other end of the capacitor 12 is connected to a capacitor terminal (C) of the monostable multivibrator 11. A NAND gate 13, a counter 14 and a clock generator 15 form the pulse width measuring circuit 3 shown in FIG.1. A Q-terminal of the monostable multivibrator 11 is connected to one input terminal of the NAND gate 13, the other input terminal of which is connected to the clock generator 15. The output terminal of the NAND gate 13 is connected to a pulse input terminal A of the counter 14. The counter 14 generates a count signal consisting of 4 bits $Q_A$, $Q_B$, $Q_C$ and $Q_D$. The output signal of the counter 14 is supplied to an input port I of a controller 9 such as a central processing unit (hereinafter simply referred to as a CPU 9) through a tri-state buffer 16 and a data bus 8. The CPU 9 supplies a trigger terminal of the monostable multivibrator 11 and the counter 14, through an output port 02 thereof, with a start pulse (shown in FIG.3(*a*)), and supplies the tri-state buffer 16, through an output port 01 thereof, with a read pulse (shown in FIG.3(*f*)). The power source voltage Vcc is set equal to +5 volts.

Figure 3:
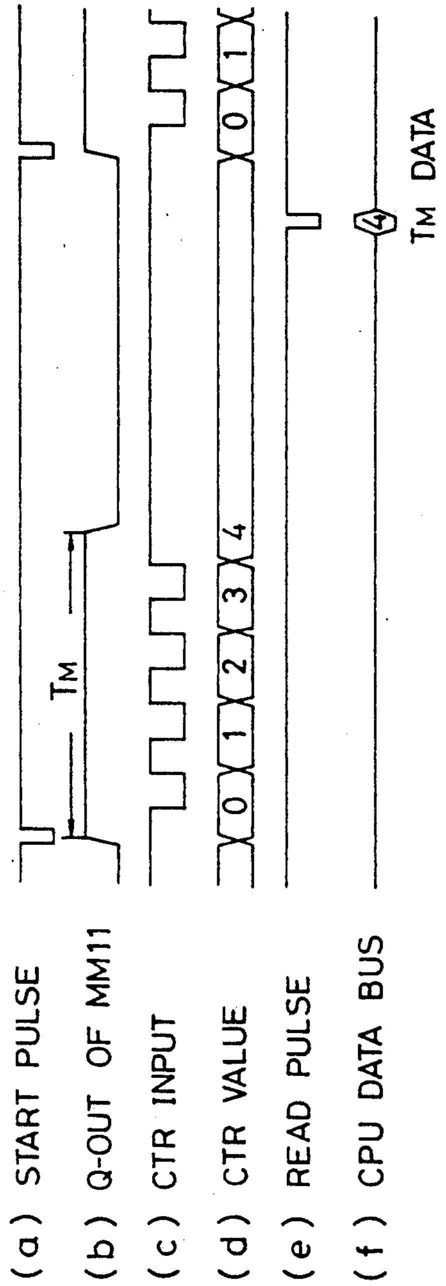
FIG.3 is a timing chart illustrating an operation of the first embodiment.

In operation, the thermistor changes its resistance depending on a variation in temperature of the thermal head 1. At the commencement of operation, the CPU 9 supplies the monostable multivibrator 11 with a start pulse (FIG.3(*a*)). The monostable multivibrator 11 outputs a pulse (FIG.3(*b*)) having a pulse width proportional to the product of a capacitance value C and resistance value $R_{TH}$ measured from the fall of the start pulse. Actually, the pulse width corresponds to a period equal to approximately 0.7 times as large as the product of the capacitance value C and resistance value $R_{TH}$. The above-mentioned pulse is output to the NAND gate 13. During the time when the monostable multivibrator 11 outputs the pulse, the NAND gate 13 passes a clock signal (FIG.3(*c*)) derived from the clock generator 15. The counter 14 starts counting the clock pulse in response to the application of the start signal from the CPU 9. When the output of the monostable multivibrator 1 falls (FIG.3(*b*)), the NAND gate 13 is closed and the counter 14 holds the current count value. In the example of FIG.3, the counter 14 has a count value equal to 4 (FIG.3(*d*)), when the output of the monostable multivibrator 11 falls. Then, as shown in FIG.3(*e*), the CPU 9 outputs the read pulse to be supplied to the tri-state buffer 16 within an appropriate time after detecting the fall of the output signal of the monostable multivibrator 11. It is noted that the pulse signal derived from the monostable multivibrator 11 is supplied to the CPU 9 through the tri-state buffer 16 and the data bus 8. Thereby, the count value held in the counter 14 is supplied to the CPU 9 through the tri-state buffer 16 and the data bus 8. In the illustrated example, a counter value of 4 is supplied to the CPU 9 as temperature data (a temperature signal). In this manner, the CPU 9 receives temperature data. Then the CPU 14 supplies the thermal head 1 with a drive current having a pulse width that has been adjusted depending on the temperature data.

The counter 14 is not limited to a 4-bit counter, and it is alternatively possible to use a counter of an arbitrary number of bits. It is preferable that the number of bits of the counter 14 be determined by taking account of a desired resolution level. For example, when the counter 14 generates a 7-bit output signal, a total of 8 bits is supplied to the data bus 8 (one bit out of 8 bits is the output signal of the monostable multivibrator 11). The above is suitable for when the CPU 9 is an 8-bit CPU.

Figure 4:
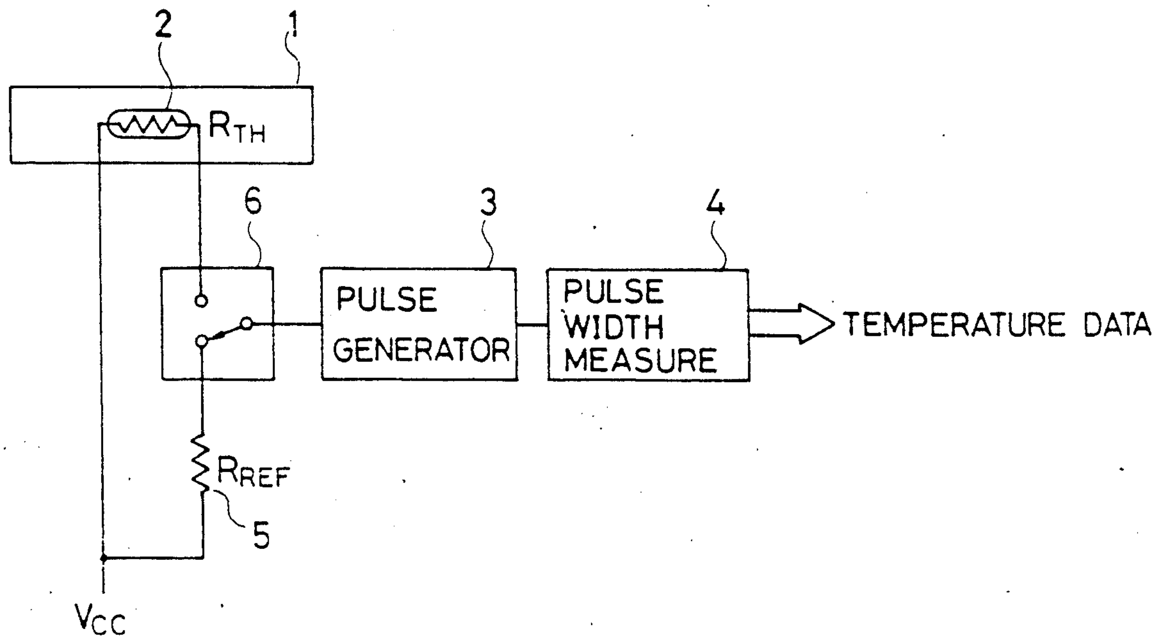
FIG.4 is a schematic block diagram of a second embodiment of the present invention.

A description is given of a second embodiment of the present invention with reference to FIG.4. In FIG.4, those parts which are the same as those in FIG. 1 are given the same reference numerals. An essential feature of the second embodiment is that a reference resistor 5 having a value of resistance $R_{REF}$ and a switch 6 are provided in addition to the structure shown in FIG.1. It is preferable to select the resistance value $R_{REF}$ based on the average resistance value of the thermal elements provided in the thermal head 1. The switch 6 selectively connects either the reference resistor 5 or the thermistor 2 to the pulse generator 3. The switch 6 is formed by a transistor switch, for example. It is noted that there is a possibility that in the first embodiment of FIG.1, the same width $T_M$ for the pulse generated by the pulse generator 3 may not be obtained due to dispersion of capacitance C and characteristics of the monostable multivibrator 11 for the same resistance value $R_{TH}$ of the thermistor 2. Therefore, the pulse width $T_M$ or the temperature data may contain an error. The second embodiment should to correct the pulse width $T_M$ which may contain an error to obtain correct temperature data. For this purpose, first, the switch 5 selects the reference resistor 5 so as to measure a pulse width $T_R$ for the reference resistor 5. Then, the switch 6 is switched to the thermistor so as to measure the pulse width $T_M$ for the resistance value $R_{TH}$ of the thermistor 2. Then the pulse width $T_M$ is corrected by the pulse width $T_R$.

Figure 5:
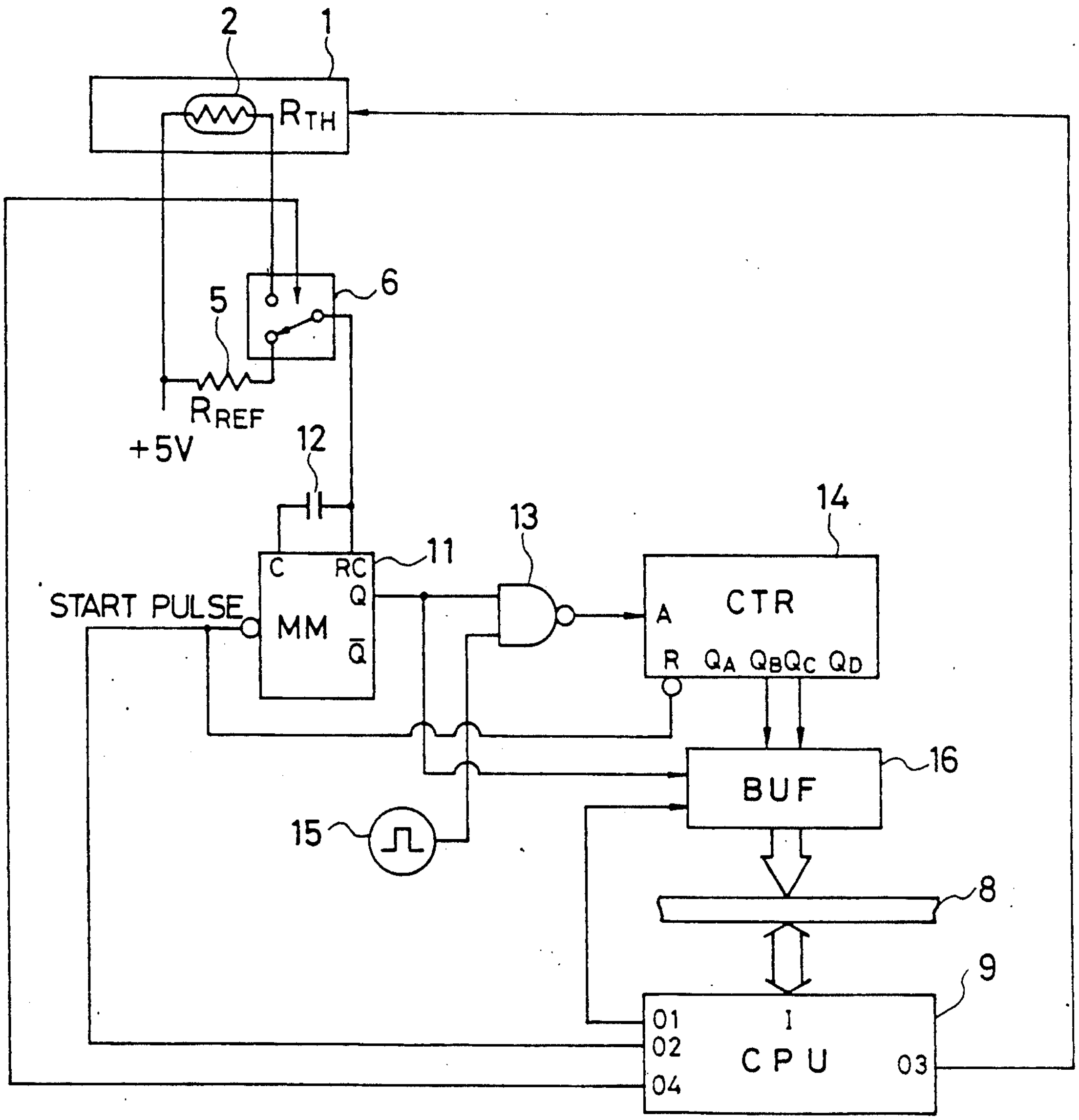
FIG.5 is a circuit diagram of the structure of FIG.4.
Figure 6:
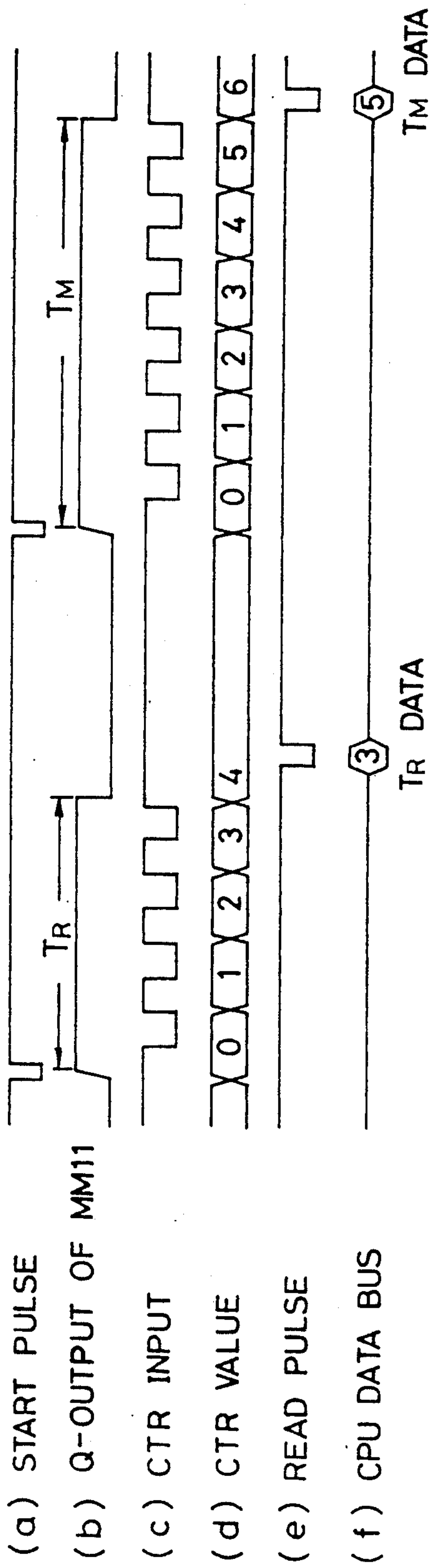
FIG.6 is a timing chart illustrating an operation of the second embodiment.

FIG.5 is a circuit diagram of the second embodiment shown in FIG.4. In FIG.5, those parts which are the same as those in FIG.2 are given the same reference numerals. As shown in FIG.6, the measurement of pulse width is carried out twice in order to obtain one temperature indication. In FIG.6, a counter value 3 indicates the pulse width $T_R$, and a counter value of 5 indicates the pulse width $T_M$. The pulse widths $T_R$ and $T_M$ have the following relationship:

$$T_R = K \cdot C \cdot R_{REF},\ T_M = K \cdot C \cdot R_{TH}$$

where K is a constant. Therefore, the following equations are obtained:

$$T_M/T_R = R_{TH}/R_{REF}$$

$$R_{TH} = (T_m/T_R) \cdot R_{REF}.$$

It is noted that currently a less-expensive high-precision resistor is available, although, a high-precision capacitor is very expensive. The second embodiment does not require a high-precision capacitor. Dispersion of capacitance C can be cancelled by calculating the ratio, $T_m/T_r$. Similarly, dispersion characteristics of the monostable multivibrator 11 can be compensated.

It can be seen from the above description that according to the present invention it is possible to detect a variation in temperature with ease. Particularly, when the circuits of FIGS.2 and 5 are suitably fabricated in an integrated circuit.

Figure 7:
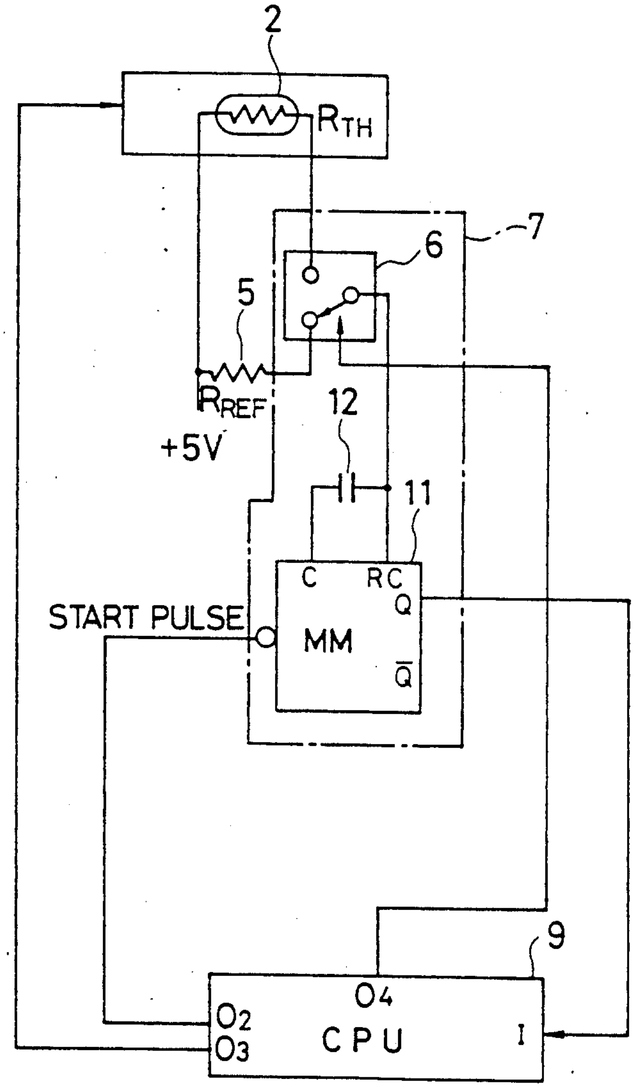
FIG.7 is a third embodiment of the present invention.

A description is given of a third embodiment of the present invention with reference to FIG.7, in which those parts which are the same as those in the previous figures are given the same reference numerals. An essential feature of the third embodiment is that the width of the pulse derived from the monostable multivibrator 11 is measured by a software procedure for the CPU 9. A one-dotted chain line block 7 is a circuit portion which is fabricated, as hardware, in an integrated circuit. The third embodiment is simpler than the first or second embodiment.

Figure 8:
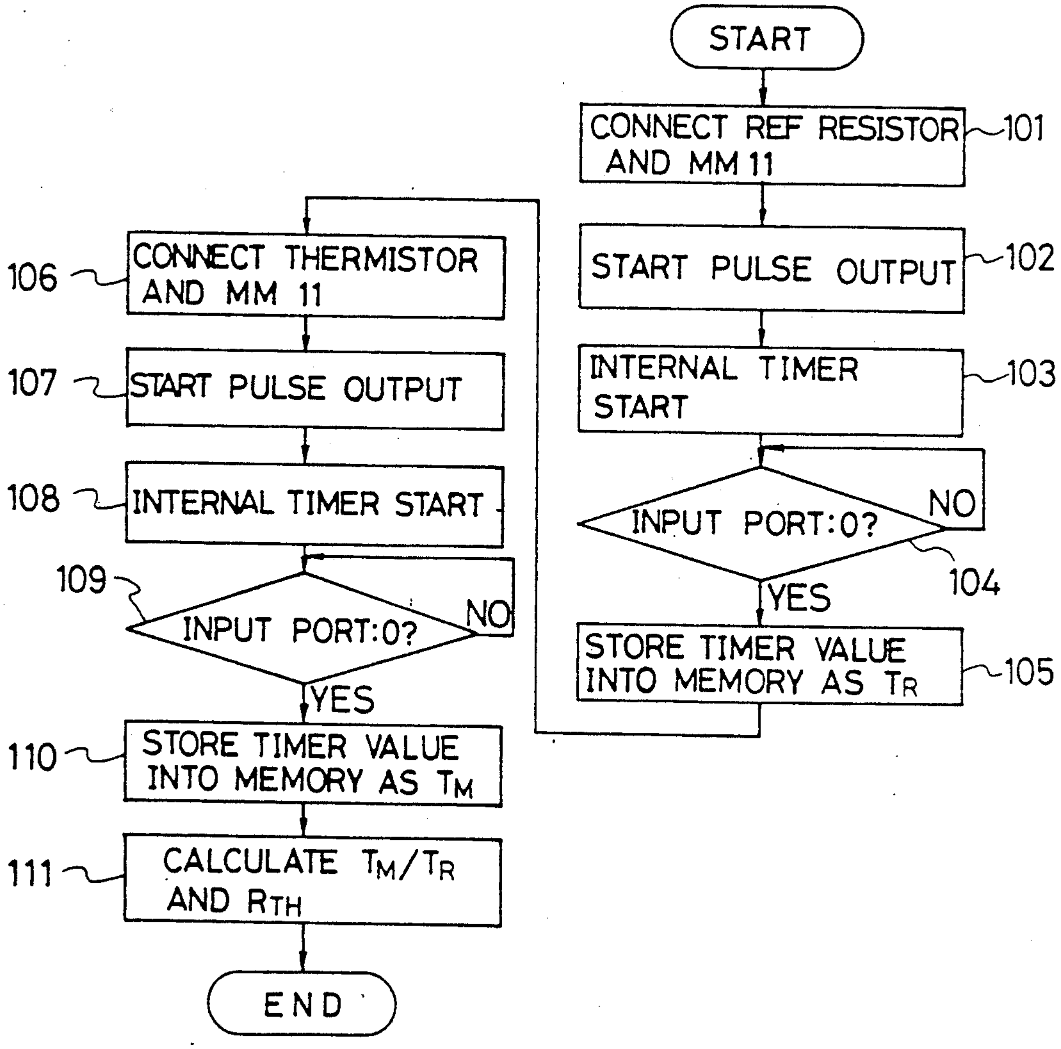
FIG.8 is a flowchart illustrating an operation of the third embodiment.

FIG.8 is a flowchart illustrating a temperature detection procedure used by the CPU 9. First, the CPU 9 controls the switch 6 to connect the reference resistor 5 and the monostable multivibrator 11 (step 101). Next, the CPU 9 resets an internal timer used for measuring the width of the pulse derived from the monostable multivibrator 11, and supplies the monostable multivibrator 11 with the start pulse (step 102). Then, the CPU 9 starts the internal timer (step 103). Thereafter, the CPU 9 determines whether the input port I thereof is provided with zero (step 104). Step 104 is repetitively carried out until the input port I becomes zero. When the input port I becomes zero, a period of time counted by the internal timer until that time, is stored into an internal memory or an external memory (not shown) connected to the CPU 9 (step 105). This period corresponds to the pulse width $T_R$ for the reference resistor 5. Thereafter, the CPU 9 controls the switch 6 to connect the thermistor 2 and the monostable multivibrator 11 (step 106). Then the CPU 9 resets the internal timer and supplies the monostable multivibrator 11 with the start pulse (step 107). Then, the CPU 9 starts the internal timer (step 108). The CPU 9, then checks whether the input port I is supplied with zero (step 109). This procedure is repetitively carried out until the input port I becomes zero. When the result in step 109 becomes YES, a period of time counted by the internal timer until that time, is stored in the internal memory (step 110). Then, in step 111, the CPU 9 calculates the correct resistance value $R_{TH}(=(T_m/T_R).R_{REF})$. Alternatively, in step 111, it is possible to obtain the correct resistance value $R_{TH}$ by accessing a table in which $T_M$ and $T_R$ serve as an address. The table defines various resistance values $R_{TH}$ for various values $T_M$ and $T_R$. The table may be formed in the CPU 9 or an external memory (not shown) connected to the CPU 9.

Figure 9:
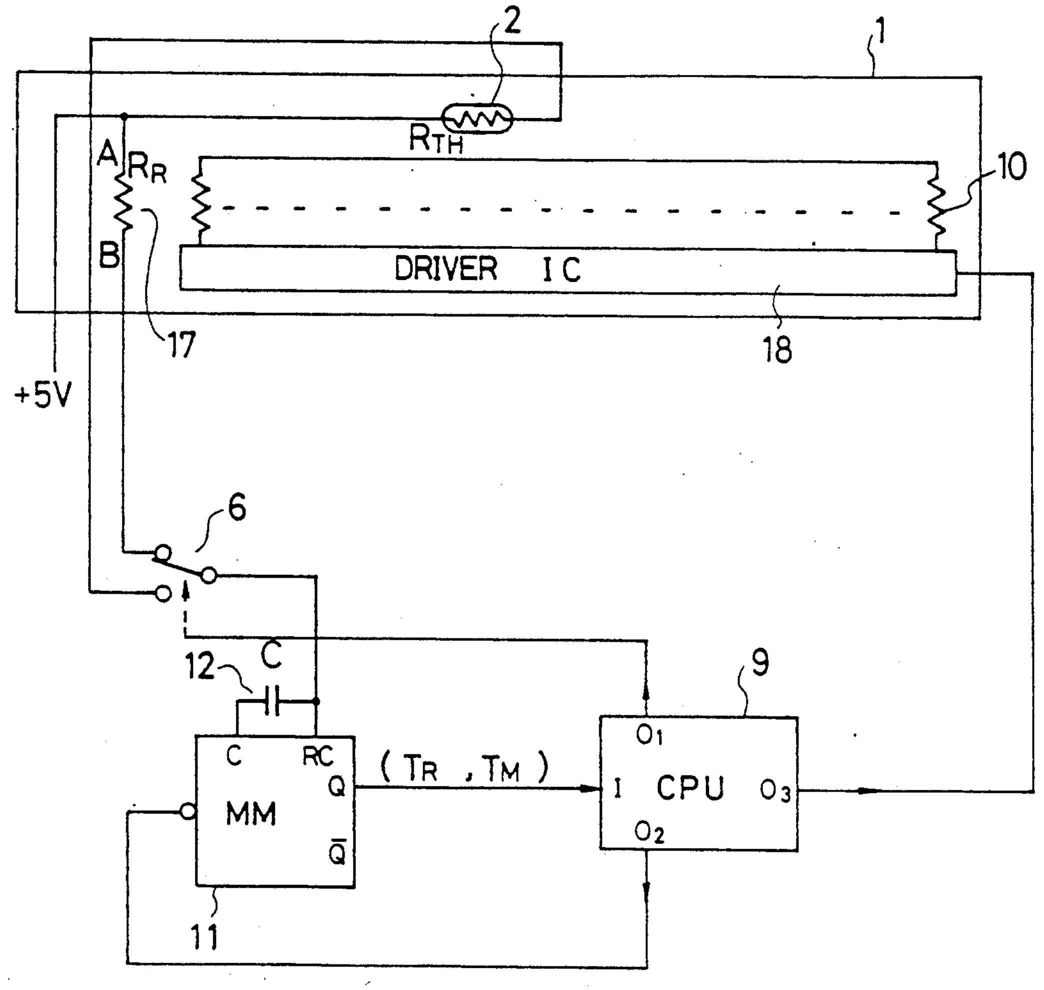
FIG.9 is a fourth embodiment of the present invention.
Figure 10A:
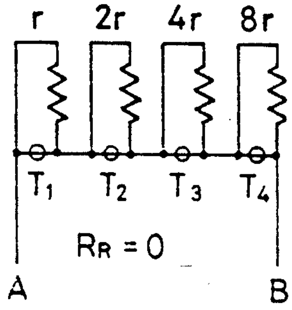
FIGS.10A and 10B are circuit diagrams of a head characteristic indication resistor used in the fourth embodiment.
Figure 10B:
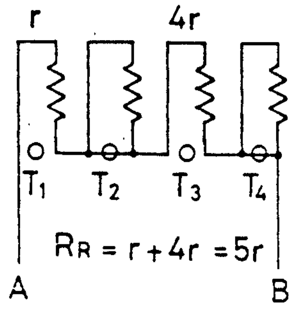

FIG.9 illustrates a fourth embodiment of the present invention. The fourth embodiment has the following features. First, a head characteristic indication resistor (hereinafter simply referred to as an indication resistor) 17 is provided in the thermal head 1. The indication resistor 17 is used for compensating an error contained in the pulse width derived from the monostable multivibrator 11 due to dispersion of the resistance values of the thermal elements 10 provided in the thermal head. This means that the optimal resistance value of the reference resistor 5 should be selected based on the average value of resistance of the thermal elements for every thermal head. The indication resistor 17 is connected to the switch 6 in the same way as the reference resistor 5 shown in FIGS.5 and 7. That is, one end of the indication resistor 17 is connected to the switch 6, and the other end thereof is supplied with +5 volts. Secondly, the indication resistor 17 is formed as shown in FIG.10A or FIG.10B. As shown in FIG.9, the thermal head 1 includes the thermal elements (thermal resistors) 10, the thermistor 2, a driver circuit 18 which drives the thermal elements 10, and the indication resistor 17. The indication resistor 17 is formed of the same member as the thermal elements 10.

FIG.10A is a circuit diagram of the indication resistor 17. The illustrated indication resistor 17 is made up of resistors r, 2r, 4r and 8r, as well as laser trimming points T1, T2, T3 and T4. It is noted that 'r' also indicates a unit of resistance. Both the ends of each of the resistors r, 2r, 4r and 8r are connected across the related laser trimming point T1 through T4. The resistance $R_R$ of the indication resistor 17 is the composite resistance value obtained across terminals A and B. For example, when all the laser trimming points T1 through T4 are not broken by heat, the resistance $R_R$ is zero. When only the laser trimming point T1 is broken, the resistance $R_R$ is equal to r. When only the laser trimming point T2 is broken, the resistance $R_R$ is equal to 2r. In this manner, the indication resistor 17 can stepwise provide 16 different ranks of resistance from 0 to 15r. It is noted that zero resistance is not used because the monostable multivibrator 11 cannot operate in such a case.

FIG.10B illustrates the case where the laser trimming contacts T1 and T3 are broken. In this case, the resistance $R_R$ is equal to 5r. The laser trimming for the laser trimming points is carried out at the same time as the laser trimming for the thermal elements 10 is carried out during manufacturing step. Generally, each of the thermal elements 10 is subjected by a laser trimming apparatus to the laser trimming in order to obtain even resistance values for the thermal elements 10. Generally, the resistance value of each thermal element is measured at the time of laser trimming. Then, the average value of resistance over all the thermal elements 10 is calculated. As described previously, it is very difficult to manufacture thermal heads each having a plurality of thermal elements exhibiting almost the same composite resistance value of the thermal elements. That is, the composite resistance value of thermal elements is different for different thermal heads. Therefore, the average value of composite resistance for the thermal elements is measured for every thermal head during manufacturing step. Thereafter, it is discerned which one of 15 predetermined ranges of resistance values is associated with the obtained average resistance value of the thermal elements 10. Finally, one or more laser trimming points are automatically broken by the laser trimming apparatus so as to make the indication resistor 17 offer a resistance suitable for the calculated average value of resistance of the thermal elements 10. The indication resistor 17 thus formed serves as the reference resistor 5 shown in FIG.5 or FIG.7.

It should be appreciated that the indication resistor 17 is provided in the thermal head 1 and that the resistance value thereof is adjusted at the time the resistance of the thermal elements 10 is adjusted by the laser trimming. Moreover, the device made up of the switch 6, CPU 9 and monostable multivibrator 11 is very simple and thus can be formed in an integrated circuit chip. The indication resistor 17 is not limited to the configuration of FIG.10A or 10B. That is, it is possible to design the indication resistor 17 so as to stepwise indicate a desired number of average resistance values. Similarly, the position of the laser trimming points is not limited to the position shown in FIG.10A or 10B. The indication resistor 17 is applicable to the embodiment shown in FIG.5.

The fourth embodiment of FIG.9 operates in the same way as the third embodiment of FIG.7. That is, the CPU 9 shown in FIG.9 operates in accordance with the procedure shown in FIG.8.

The present invention is not limited to the aforementioned embodiments, and variations and modifications may be made without departing from the scope of the invention.

What is claimed is:

1. A thermal head device comprising:

a thermal head including a plurality of thermal elements;

a temperature-sensitive element positioned in the vicinity of said thermal head to measure a temperature thereof, said temperature-sensitive element changing its resistance with a temperature variation;

a reference resistor having a reference resistance corresponding to an average resistance value of said temperature-sensitive element;

switching means for selecting one of said temperature-sensitive element and said reference resistor;

control means for generating a start pulse signal to initiate a measurement of the temperature of said thermal head;

pulse generating means, coupled to said switching means and said control means, for separately generating a first one-shot pulse and a second one-shot pulse in response to said start pulse signal supplied from said control means, said first one-shot pulse having a first pulse width indicative of said reference resistance and said second one-shot pulse having a second pulse width dependent on the resistance of said selectively connected temperature-sensitive element;

pulse width measuring means, connected to said pulse generating means, for measuring said first pulse width and said second pulse width, said first pulse width being obtained when said switching means selects said reference resistor, and said second pulse width being obtained when said switching means selects said temperature-sensitive element;

temperature signal generating means for generating a temperature signal indicative of the temperature of said thermal head from said first and second pulse widths supplied from said pulse width measuring means so that an error contained in said second pulse width is canceled by said first pulse width; and driving means for generating a driving signal to be supplied to said plurality of thermal elements from said temperature signal.

2. A thermal head device as claimed in claim 1, wherein said reference resistor is provided in said thermal head which includes a plurality of thermal elements.

3. A thermal head device as claimed in claim 1, wherein said reference resistor is provided in said thermal head and includes resistors, said resistors being coupled through trimming points.

4. A thermal head device as claimed in claim 3, wherein one or more of said trimming points are broken in order to match said reference resistance to the average value of resistance over said plurality of thermal elements.

5. A thermal head device as claimed in claim 4, wherein said one or more trimming points are broken by laser energy.

6. A thermal head device as claimed in claim 4, wherein one or more of said trimming points are broken at the same time as the resistance value of each of said thermal elements is adjusted so as to provide uniform resistance values over said thermal elements.

7. A temperature measuring device comprising:

a temperature-sensitive element positioned in the vicinity of a member to measure a temperature thereof, said temperature-sensitive element changing its resistance with a temperature variation;

a reference resistor having a reference resistance corresponding to an average resistance value of said temperature-sensitive element;

switching means for selecting one of said temperature-sensitive element and said reference resistor;

control means for generating a start pulse signal to initiate a measurement of the temperature of said member;

pulse generating means, coupled to said switching means and said control means, for separately generating a first one-shot pulse and a second one-shot pulse in response to said start pulse signal supplied from said control means, said first one-shot pulse having a first pulse width indicative of said reference resistance and said second one-shot pulse having a second pulse width dependent on the resistance of said selectively connected temperature-sensitive element;

pulse width measuring means, connected to said pulse generating means, for measuring the width of said first one-shot pulse and the width of said second one-shot pulse supplied from said pulse generating means, said first pulse width being obtained when said switching means selects said reference resistor, and said second pulse width being obtained when said switching means selected said temperature-sensitive element; and temperature signal generating mean for generating a temperature signal indicative of the temperature of said member from said first and second pulse widths supplied from said pulse width measuring means to so that an error contained in said second pulse width is canceled by said first pulse width.

8. A temperature measuring device as claimed in claim 7, wherein said temperature signal generating means generates said temperature signal by calculating the ratio of said second pulse width to said first pulse width and multiplying said ratio and the resistance of said reference resistor.

9. A temperature measuring device as claimed in claim 8, wherein said pulse width measuring means further includes buffer means for outputting the numbers of said counted clock pulses to an external circuit.

10. A temperature measuring device as claimed in claim 9, wherein said buffer means included in said pulse width measuring means includes a tri-state buffer.

11. A temperature measuring device as claimed in claim 7, wherein:

said pulse generating means includes a capacitor as well as a monostable multivibrator having a trigger terminal, a capacitor/resistor terminal, a capacitor terminal and an output terminal, said capacitor is connected between said capacitor/resistor terminal and said capacitor terminal, said temperature-sensitive element and said reference resistor are selectively connected to said capacitor/resistor terminal, the other end of each of said temperature-sensitive element and said reference resistor being supplied with a power source voltage, and said first and second one-shot pulses are supplied to said pulse width measuring means through said output terminal.

12. A temperature measuring device as claimed in claim 7, wherein said pulse width measuring means includes clock generating means for generating clock pulses, and counter means for counting said clock pulses during the respective times when said first and second one-shot pulses derived from said pulse generating means are supplied to said counter means, and wherein the respective numbers of counted clock pulses correspond to said pulse widths and therefore are related to the temperature of said member.

13. A temperature measuring device as claimed in claim 12, wherein said pulse width measuring means further includes gate means, connected to said pulse generating means, said clock pulse generating means and said counter means, for passing said clock pulses derived from said clock pulse generating means during the times when said first and second one-shot pulses derived from said pulse generating means are supplied to said gate means.

14. A temperature measuring device as claimed in claim 7, wherein said temperature-sensitive element includes an element selected for the group consisting of a thermistor and a posistor.

15. A temperature measuring device as claimed in claim 7, wherein said temperature signal generating means generates said temperature signal indicative of the temperature of said member from said first and second pulse widths supplied from said pulse width measuring means by software provided therein.

* * * * *